US007643459B2

(12) United States Patent
Miller et al.

(10) Patent No.: US 7,643,459 B2
(45) Date of Patent: Jan. 5, 2010

(54) METHODS, DEVICES AND ARCHITECTURES FOR ESTABLISHING PEER-TO-PEER SESSIONS

(75) Inventors: Scott C. Miller, Freehold, NJ (US); Oliver Haase, Baden-Wuerttemberg (DE); Girish P. Chandranmenon, Edison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 600 days.

(21) Appl. No.: 11/453,800

(22) Filed: Jun. 16, 2006

(65) Prior Publication Data

US 2007/0291706 A1    Dec. 20, 2007

(51) Int. Cl.
*H04W 4/00* (2009.01)
(52) U.S. Cl. .................................... 370/338; 370/254
(58) Field of Classification Search .................. None
See application file for complete search history.

(56) References Cited

U.S. PATENT DOCUMENTS

| 2001/0047276 | A1 | 11/2001 | Eisenhart |
| 2005/0113123 | A1 | 5/2005 | Torvinen |
| 2005/0243740 | A1* | 11/2005 | Chen et al. .............. 370/256 |
| 2006/0203739 | A1* | 9/2006 | Padmanabhan et al. .... 370/252 |
| 2007/0064702 | A1* | 3/2007 | Bates et al. ............... 370/392 |

FOREIGN PATENT DOCUMENTS

| EP | 1587282 A2 | 10/2005 |
| WO | 2005/107218 A1 | 10/2005 |

OTHER PUBLICATIONS

F. Dabek et al., *Building Peer-To-Peer Systems With Chord, a Distributed Lookup Service*, Proceedings of the 8th Workshop on Hot Topics in Operating Systems (HotOS-VIII), May 2001.
I. Stoica et al., *Chord: a Scalable Peer-To-Peer Lookup Service For Internet Applications*, SIGCOMM'01, Aug. 2001.
Xu et al, "HIERAS: A DHT based hierarchical P2P Routing Algorithm", Proceedings—2003 International Conference on Parallel Processing (ICPP '03).
Stoica et al, "Chord: A scalable peer-to-peer lookup protocol for internet applications", IEEE/ACM Transactions on Networking 11(1), Feb. 2003: 17-32.

* cited by examiner

*Primary Examiner*—Erika A Gary
(74) *Attorney, Agent, or Firm*—The Capitol Patent & Trademark Law Firm, PLLC

(57) ABSTRACT

Signaling paths and communication sessions, such as voice-over-IP sessions, can be established in substantially shorter and predictable time periods than previously thought possible over carrier-based, peer-to-peer networks (P2P). Instead of requiring a signaling pathway to traverse a large number of hops/nodes, novel architectures permit a signaling pathway to traverse a few designated host and anchor nodes that are part of a core of a P2P network. The novel architectures and related methods also make it possible to easily manage and maintain P2P networks.

18 Claims, 1 Drawing Sheet

METHODS, DEVICES AND ARCHITECTURES FOR ESTABLISHING PEER-TO-PEER SESSIONS

BACKGROUND OF THE INVENTION

Peer-to-peer networks are completely decentralized networks consisting of identical nodes, each of which can act as a "client" (in the sense of a traditional client-server network) and assume the responsibilities of a server at the same time. Because each element of a peer-to-peer (sometimes referred to as "P2P") network is the same, they are easily scalable. For example, a peer-to-peer network may grow by simply adding more nodes (e.g., telephones, computers, personal digital assistants ("PDAs")). In addition to being easily scalable it is fairly straightforward to maintain the reliability of peer-to-peer networks.

Typically, nodes or peers within a P2P network monitor each other. If a node or peer fails one or more of the remaining nodes takes over the responsibilities of the failed node. The architectural simplicity of peer-to-peer networks make them attractive for use with certain types of services, such as voice-over-Internet Protocol ("VoIP"). As issues involving the ease of configuring a network and the maintenance costs of a network grow peer-to-peer networks may provide advantages over existing carrier grid networks.

In a conventional peer-to-peer network each node or peer (the two words will be used interchangeably herein) stores attributes known as "key, value" pairs. For example, a key may indicate a user identification ("user ID") while a value may represent the address of a node. To establish a communication session between a source and destination node in a conventional peer-to-peer network the address of the destination node must be determined by locating a given key,value pair within a node that includes the value (i.e., address) of the destination node using only the key transmitted by the source node. More specifically, each node in the network that receives the transmitted key compares the key to key,value pairs stored in its look-up table or the like. Assuming at least one node contains the key,value pair associated with the destination node, the value (i.e., address) of the destination is returned to the source. Thereafter, the source sets up a signaling path with the destination node. Said another way, if one user wishes to make a VoIP telephone call to another, the caller transmits the intended recipient's user ID to other users (i.e., their devices) in the peer-to-peer network. Using lookup tables and search functions, the address of the recipient is found and returned to the caller to permit the establishment of a signaling path, and eventually a communication session, between the caller and the recipient.

Early peer-to-peer networks "flooded" requests to establish sessions into the entire network or parts of it until the desired key,value pair was identified (i.e., until the address of the recipient of a call was located). However, flooding does not work well in large peer-to-peer networks. To overcome the disadvantages of such a technique, many recent peer-to-peer networks have begun to use distributed hash tables ("DHT") to store and retrieve key, value pairs.

For example, using DHTs peer-to-peer networks assign a hashed key to each node in the network. By assigning hashed keys to nodes in the network, the time it takes to locate the address of an intended recipient of a call and the like is decreased.

In mathematical terms, it can be said that techniques which use DHTs guarantee an upper bound of O (log N) steps (which corresponds to a time period). In other words, the use of DHTs assures that the maximum number of steps it will take to identify a user (i.e., establish a session) within a peer-to-peer network is O(log N). This provides a way to estimate the time period it will take to locate a recipient's address; a distinct advantage over flooding techniques which, in some cases, would require an indeterminate number of steps or time period to locate a recipient.

Though the use of DHTs provides advantages over earlier techniques, the way they are presently used is still inadequate for use in voice applications/services. More particularly, while present techniques utilizing DHTs provide acceptable time periods to locate a recipient's address for file sharing and other data transfer applications/services, they provide unacceptable time periods when used in voice/video applications. Roughly speaking, using an existing DHT technique it takes an average of 10 steps to find a key, value pair in a network of 1 million nodes. However, in a worst case scenario it may take as many as 20 steps. Using 10 or 20 steps to locate the address of an intended recipient in voice or video applications is undesirable (i.e., it takes too long). Further, as a conventional P2P network gets larger, there also exists the possibility that the number of steps will increase as the number of nodes in the network increases. Thus, while it is still possible to determine the number of steps required to establish a session this number may be too high to provide an acceptable service/application.

Accordingly, it is desirable to provide methods, devices and architectures were DHTs can be used by nodes within a P2P network to establish signaling and communication sessions within an acceptable time period in voice, video and similar applications.

SUMMARY OF THE INVENTION

The present inventors have discovered peer-to-peer architectures that utilize DHTs to establish voice and video communication sessions in carrier-based infrastructure networks much faster than previously thought possible. In accordance with one embodiment of the present invention, a provisioning server or the like designates nodes within a peer-to-peer network as host and anchor nodes. By designating certain nodes as host and/or anchor nodes, the architectures provided by the present invention require fewer hops (e.g., intermediate nodes) to establish communication sessions when compared to conventional peer-to-peer networks. The use of fewer hops in combination with novel cached-assisted look-up functions enables the architectures provided by the present invention to establish signaling paths and associated communication sessions in O(1) steps instead of a O(log N) steps. Said another way, the use of fewer hops and novel look-up functions permits signaling paths and communication sessions to be established between nodes in a peer-to-peer network faster than previously thought possible. Further, as a P2P network grows, the novel methods provided by the present invention assure that the time it takes to establish a given session remains the same (i.e., a "constant" time period for establishing a session is maintained).

It should be noted that the techniques provided by the present invention can be used in many different types of P2P network configurations. One such P2P network is known as "Chord".

In more detail, in accordance with one embodiment of the present invention, a provisioning server assigns a hashed key to each host and anchor node in a peer-to-peer network.

Further, to achieve the speed needed to establish voice/video signaling paths/sessions, the provisioning server geographically associates each user with at least one host node and anchor node. Each host node is operable to store key, value pairs (e.g., identity and address) of one or more geographically associated users while each anchor node is assigned a hashed key. In accordance with the present invention, instead of requiring a signaling pathway to traverse a large number of hops/nodes, the novel architectures provided by the present invention are made up of a smaller subset of designated host and anchor nodes that form a core of a P2P network. This allows a signaling pathway to be established quickly.

Though host nodes are geographically associated with users, anchor nodes are associated in a different fashion. In accordance with the present invention, the anchor node that is associated with a given user is the node that has a hashed key, the value (amount, not address) of which is equal to, or greater than, the value of a user's key. In addition, each anchor node is operable to store the key,value pair (e.g., identity and address) of the primary and secondary host nodes that have been geographically associated with its associated users. It should be further noted that the architectures provided by the present invention may utilize the anchor node-related replication and reliability mechanisms (i.e., back-up) of the underlying P2P methodology (e.g., Chord) to ensure the network operates satisfactorily when an anchor node becomes disabled, etc. For example, an anchor node's look-up table entries that indicate/locate a user's primary and secondary host nodes are backed-up using P2P methodology.

In an additional embodiment of the present invention one or more of the anchor nodes may also be a host node that is operable to store the key,value pairs (e.g., identities and addresses) of a plurality of geographically associated users.

To make the time period required to establish a session even shorter, the present invention also provides architectures which include host nodes that are operable to store, for each of its associated users, the key,value pairs (e.g., identities and addresses) of one or more nodes associated with one or more third party users that are frequently involved in a session with an associated user. For example, a host node may include a cache or a caching function which allows it to store the nodes (e.g., host nodes) that are associated with friends a user talks with most often. By caching the nodes, a signaling path and associated session may be established with these friends quicker without having to use an anchor node, as will be explained in more detail below.

To make the architectures provided by the present invention even more reliable, a provisioning server may associate one or more users with two or more host nodes (instead of one). In this manner, if a user's primary host node is unable to establish/maintain a signaling path/session due to a failure or the like the user may rely on a secondary host node. As set forth above, the addresses of a user's primary and secondary host node may be stored in the user's associated anchor node look-up tables. In order to ensure that the load on a given P2P network is evenly distributed when a failure occurs, the secondary host nodes associated with a given user may vary from user to user. That is, though a given set of users may be associated with the same primary host node, they may not be associated with the same secondary host node. Thus, if and when the primary host node fails its load (i.e., users) may be distributed to many secondary host nodes instead of one.

DETAILED DESCRIPTION OF THE INVENTION, WITH EXAMPLES

Figure 1:
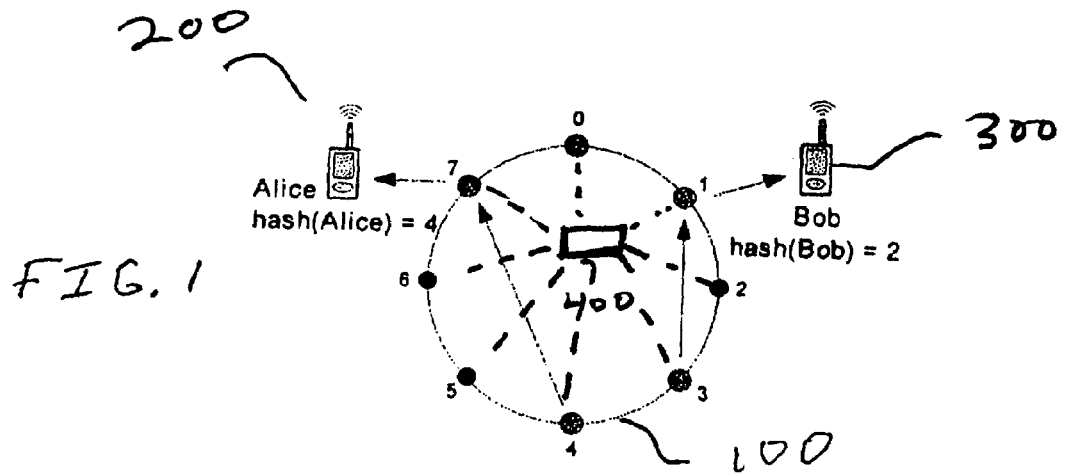
FIG. 1 depicts a simplified example of a peer-to-peer network in accordance with one embodiment of the present invention.

Referring now to FIG. 1 there is shown a peer-to-peer network 100 which includes one or more users, 200, 300, one or more host and/or anchor nodes labeled 0 through 7 and a provisioning device, such as a server, 400. Though referred to throughout this discussion as "users", it should be understood that the users 200,300 may be devices, such as telephones, personal digital assistants, computers, gaming devices, multimedia devices and the like to name some examples of devices that are associated with an actual person(s). In accordance with the present invention, the provisioning server 400 is operable to assign each user a hashed key in addition to being assigned an address on the peer-to-peer network 100. To distinguish those hashed keys assigned to a user from those assigned to a node, we will refer to the former as key and the later as hashed key. The server 400 also assigns a hashed key to each of the nodes 0 through 7. To simplify the present explanation, the hashed keys of nodes 0 through 7 will also be 0 through 7 (i.e., Node 0 has hashed key of 0. Node 4 has a hashed key of 4, and so on).

To establish a signaling path and communication session in accordance with the present invention, the provisioning server 400 may be further operable to associate each user with a host node that is geographically closest to the user. In FIG. 1, for user 200 this is node 7. Therefore, node 7 will be the host node that is associated with the user 200. As briefly mentioned above, to ensure that the peer-to-peer network 100 is reliable in the event that host node 7 fails, the provisioning server 400 may also be operable to associate the user 200 with two or more host nodes. For example, the server 400 may associate the user 200 with host node 0. Thus, should host node 7 fail, host node 0 will help the user 200 establish signaling paths/communication sessions. To distinguish between two host nodes associated with the same user, the first host node may be referred to as a primary host node while the backup host node may be referred to as a secondary host node. In order to ensure that the load on a given P2P network is evenly distributed when a failure occurs, the secondary host nodes associated with a given user may vary from user to user. That is, though a given set of users may be associated with the same primary host node, they may not be associated with the same secondary host node. Thus, if and when the primary host node fails its load (i.e., users) may be distributed to many secondary host nodes instead of one.

In addition to associating host nodes with users (or vice-versa) the server 400 may also separately associate one or more anchor nodes to each user. In accordance with the present invention, the association of a given anchor node with a given user depends on the technique used by the underlying P2P methodology. In the examples and discussion which follows the Chord P2P methodology is used. In accordance with one exemplary method of the present invention, the server 400 may associate an anchor node with a user as follows. The server 400 determines which node within network 100 has the smallest hashed key, the value (amount, not an address) of which is equal to, or greater than, the value of the user's key. In the example shown in FIG. 1, Alice's key has a value of 4. The server 400 passes this information on to every node in the network 100 so that, thereafter, each node will be able to identify the node within network 100 that has a hashed key value of 4 as the anchor node for the user 200. In this example, that is node 4.

Similarly, though only two users 200, 300 are shown in FIG. 1 it should be understood that the provisioning server 400 may associate a plurality of users to each host node. Therefore, host node 7 may be associated with many more users than just user 200. Once associated with a user, a host node is operable to store the key,value pair (e.g. user ID and address) of the user.

Likewise, the anchor node 4, and in general, each anchor node within the network 100, may be operable to store the identity and address of a plurality of host nodes that have been geographically associated with one or more users. Shortly, we will explain how architectures provided by the present invention, such as the network architecture 100 illustrated in FIG. 1, may be used to quickly establish a signaling path and communication session. For now, however, it should be understood that the network architecture 100 shown in FIG. 1 permits a signaling path to be established in O(1) steps, amounting to a so-called "constant" time period. By "constant" time period it is meant a time period that does not change when the total number of nodes or number of users in the network changes (e.g. increases). That is, regardless of the number of nodes and number of users in a P2P network, a signaling path/communication session from a given starting point to a given destination can be established using the same number of steps (the number of steps remains constant).

The signaling paths and sessions established by the network architecture 100 in FIG. 1 may be used to provide, VoIP services, other voice services, data services, and video services to name just a few examples.

In still further embodiments of the invention, the provisioning server 400 may be operable to detect and analyze the communication patterns and habits of one or more users. The server 400 may use this information to determine whether the host nodes it has initially geographically associated with a user should be changed. For example, if the server 400 detects that one or more users are often located in the same geographical area, the server 400 may associate such users to the same host node. This re-association may improve the quickness in which a signaling path/session is established.

We mentioned before that a user may be associated with more than one host node (e.g., in case a user's primary host node fails). The same is true for anchor nodes. In accordance with the present invention, the back-up anchor node technique used is determined by the underlying P2P methodology.

Having presented a discussion of the various elements in the P2P network architecture 100 shown in FIG. 1, we now turn our attention to how these elements operate to establish a signaling path/communication session in a constant, shorter time period than previously thought possible.

Figure 2:
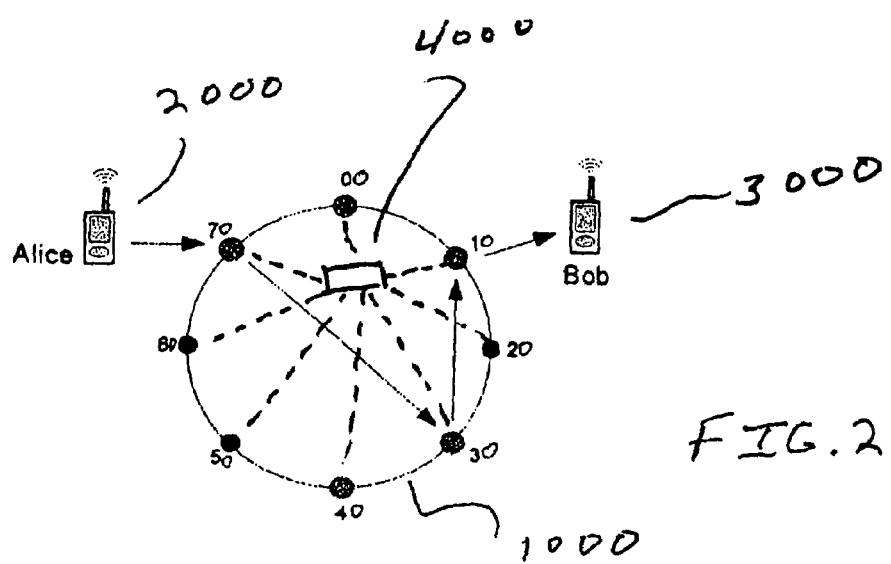
FIG. 2 depicts a simplified diagram of a peer-to-peer network in accordance with another embodiment of the present invention.

Referring now to FIG. 2, there is shown another ring-like P2P network architecture 1000 in accordance with an embodiment of the present invention. The network architecture 1000 shown in FIG. 2 includes one or more users 2000, 3000, one or more host and/or anchor nodes labeled 00 through 70 and provisioning server 4000.

In order to establish a session in a constant time period, in one embodiment of the present invention, a request from user 2000 to establish a signaling path/session (e.g., telephone call) with user 3000 is first routed to the host node 70 of user 2000, then to the anchor node 30 of user 2000, on to the host node 10 of the recipient user 3000 and then on to the recipient user 3000. By recipient it is meant the user who is the intended to receive the telephone call, etc. from the user 2000.

By routing a request to establish a signaling path/session through designated host and anchor nodes the number of nodes that are involved in establishing a signaling path/session remains constant as the network grows. This is a significant advantage over existing peer-to-peer network architectures. In essence, the present invention creates an infrastructure that contains a set of host nodes and anchor nodes; a set of nodes within a P2P network (where each node knows all other nodes). Because the number of nodes in a P2P network provided by the present invention is, typically, far smaller and more stable than those in a traditional P2P a signaling path/communication session can be established in a far more predictable and faster manner than previously thought possible. We now present an alternative explanation of how a signaling path/session may be established in accordance with the present invention.

In the beginning, it can be assumed that the user 2000 knows that she wishes to speak to the user 3000 but she does not know where the user 3000 is located. The user 2000 (i.e., a device in use by the user 2000) may generate and send a request to establish a signaling path/session with the user 3000 to its host node 70. Within this request is a key (e.g., user ID) which identifies the user 3000.

Upon receiving the request from the user 2000, the primary host node 70 may be operable to forward the request to the primary anchor node 30, it being understood that the anchor node 30 is the first node from the user 2000 whose hash key value is equal to, or greater than the value of the user's key. Upon receiving the request, the anchor node 30 is operable to determine at least one, primary host node that is associated with the user 3000. That is, the anchor node 30 is the element which determines which host node is associated with the intended recipient (i.e., user 3000).

In accordance with the present invention, each anchor node comprises a storage section which stores the identities and addresses of host nodes and the users associated with these host nodes. In the example shown in FIG. 2, the anchor node 30 would search through or otherwise access its storage section to identify the identity an address of the host node which is associated with the user 3000. In this case, that host node would be node 10 shown in FIG. 2.

Upon identifying the host node 10 associated with the user/recipient 3000, the anchor node 30 is further operable to forward the request to establish a session to the host node 10. It should be understood that it is assumed that the host node 10 is available to receive such a request.

In accordance with the present invention, the anchor node 30 may have stored both a primary and secondary host node for the user 3000. This is done in order to ensure that a signaling path/session may be established if the host node 10 is otherwise unavailable. That being said, as the primary host node associated with the user 3000, node 10 will be selected first by the anchor node 30.

The anchor node 30 is operable to forward the request to form a signaling path/session to host node 10 which, thereafter, begins to initiate a signaling path/session with the user/ recipient 3000. It should be understood that in the event that the request is forwarded to a secondary host node, the present invention provides for the establishment of a signaling path/ session in a constant time period as well. That is to say, the use of a secondary host node does not significantly impact the time it takes to establish a signaling path/session.

Though the architectures shown in FIGS. 1 and 2 are effective in establishing signaling paths/sessions in a significantly shorter time period than conventional techniques, the present inventors realized that the time period could be further shortened by studying the communication and location habits and patterns of a user. In still a further embodiment of the present invention, a provisioning server 4000 or the like in FIG. 2 may monitor and analyze the habits and patterns of users within the network 1000. For example, the server 4000 may identify those users that are frequently involved in a session with user 2000 most often. Thereafter, the provisioning server 4000 may identify the hosts associated with the identified users. Once the users and their associated hosts are identified, the provisioning server 4000 may communicate with the host node of the user 2000 in order to provide the host node 70 with this information. Upon receiving this information, the host node 70 may cache this information in a storage or memory section. Thereafter, when the user 2000 sends a request to establish a signaling path/session with any of the users that she communicates with most often (i.e., the identified users), the host node 70 may consult its cache, and identify the host node associated with one of these users. By identifying the host node of such a "buddy", the host node 70 may bypass the anchor node 30 and send the request directly on to the buddy's host node. By bypassing the anchor node the time it takes to establish a signaling path/session may be further shortened.

In some instances, it may occur that the key value of a user is greater than all of the hash key values of any of the nodes in a network. If this occurs, the present invention may provide for the following exemplary method of associating an anchor node with a user; a method that is based on the Chord methodology as well.

In accordance with a Chord-related example of the present invention, the provisioning server 4000 and the like may associate a user with an anchor node that has the lowest key value when the value of the user's key is greater than the value of each of the hash keys of nodes in the network. It should be noted that, as recognized by those skilled in the art, there occurs a scenario known as a "wrap around" where this association technique may be altered somewhat. In accordance with Chord methodology, when a wrap-around scenario presents itself all of the users whose hash keys are larger than the largest key of any node in a given network are anchored at the node that has the lowest key in the network.

In the discussion above, it was assumed that the architectures 100, 1000 shown in FIGS. 1 and 2 were a part of a single network operated by a single service provider. However, the present invention is not limited just to networks operated by the same service provider. In accordance with additional embodiments of the present invention the features and functions of the present invention may be extended to architectures that include networks run by more than one service provider.

In yet a further embodiment of the present invention, one or more nodes of each of the networks operated by different service providers may act as a proxying node in order to establish signaling paths/sessions between nodes in two different networks. In this embodiment, the internal network typology of the different service providers is not disclosed. In yet another embodiment, one or more nodes of each of the networks may store or cache the host node addresses of users in the different networks. While this may result in faster establishment of a signaling path/session, it may require the disclosure of the internal typology of a given service provider's network.

As briefly mentioned above, provisioning servers or the like may be used to associate host and anchor nodes to users and vice-versa. Further, such servers may also be used to assign hash values to users and nodes. In general, a server or device that is used in the architectures provided by the present invention may include one or more computer readable mediums (e.g., memory, processors, hard drives, CD/DVD storage or some combination of these devices) for storing one or more software or firmware programs that may be executed to implement the features and functions of the present invention.

The discussion above has set forth some examples of the present invention. Some of the features provided by the present invention are: (a) cached-based P2P networks with reduced look-up/session establishment time periods; (b) separate host and anchor nodes for reducing establishment time periods and enhancing the geographic association of users to nodes; and (c) the even distribution of load upon node failure.

The true scope of the present invention, however, is set forth in the claims that follow in which the term "session" will be used to denote a signaling path, communication session or both.

We claim:

1. An architecture that enables a session to be established in a distributed hash table (DHT)-based, peer-to-peer network in a constant time period comprising:
    a provisioning server operable to,
        geographically associate one or more users with at least one primary host node, and
        further associate each user to at least one anchor node,
    wherein the associations enable a session to be established in a constant time period.

2. The architecture as in claim 1 further comprising one or more primary host nodes, each host node operable to:
    store the identity and address of one or more associated users; and
    forward a request to establish a session from an associated user to an anchor node or a host node of a recipient user.

3. The architecture as in claim 1 further comprising one or more anchor nodes, each anchor node operable to:
    store the identity and address of at least one primary host node that has been geographically associated with one or more users; and
    forward a request to establish a session with an associated user to a host node of an intended recipient of the request using a stored identity and address of the recipient's host node.

4. The architecture as in claim 1 wherein the provisioning server is further operable to associate users associated with the same primary host node to different secondary host nodes to evenly distribute the primary host node's load throughout the network when the primary host node is unavailable.

5. The architecture as in claim 4 wherein each anchor node is further operable to store the identity and address of at least one secondary host node associated with each user,
    wherein each secondary host node is a back-up host node for its respective user when the primary host node is unavailable.

6. The architecture as in claim 3 wherein one of the anchor nodes is also a host node operable to store the identities and addresses of a plurality of geographically associated users.

7. The architecture as in claim 1 wherein the session comprises a voice-over-IP (VoIP) session.

8. The architecture as in claim 2 wherein each host node is operable to store, for each of its associated users, the identity and address of one or more host nodes associated with one or more third party users that are frequently involved in a session with an associated user.

9. The architecture as in claim 1 wherein the network is part of a carrier network.

10. A method for establishing a session in a distributed hash table (DHT)-based, peer-to-peer network in a constant time period comprising:

geographically associating one or more users with at least one primary host node, and further associating each user to at least one anchor node wherein the associations enable a session to be established in a constant time period.

11. The method as in claim 10 further comprising:

storing the identity and address of one or more associated users in one or more primary host nodes; and forwarding a request from a primary host node to an anchor node or a host node of an intended recipient of the request to establish a session between the recipient and a user associated with the forwarding host node.

12. The method as in claim 10 further comprising:

storing the identity and address of at least one primary host node that has been geographically associated with one or more users in one or more anchor nodes; and forwarding a request from an anchor node to a host node of an intended recipient of the request using a stored identity and address of the recipient's host node to establish a session between the recipient and a user associated with the forwarding anchor node.

13. The method as in claim 10 further comprising associated users associated with the same primary host node to different secondary host nodes to evenly distribute the primary host node's load throughout the network when the primary host node is unavailable.

14. The method as in claim 13 further comprising storing the identity and address of at least one secondary host node associated with each user, wherein each secondary host node is a back-up host node for its respective user when the primary host node is unavailable.

15. The method as in claim 12 further comprising storing the identities and addresses of a plurality of geographically associated users in one of the anchor nodes.

16. The method as in claim 10 wherein the session comprises a voice-over-IP (VoIP) session.

17. The method as in claim 10 further comprising, for each of its associated users, storing the identity and address of one or more host nodes associated with one or more third party users that are frequently involved in a session with one of its associated users in an associated primary host node.

18. The method as in claim 10 wherein the network is part of a carrier network.

\* \* \* \* \*

UNITED STATES PATENT AND TRADEMARK OFFICE
CERTIFICATE OF CORRECTION

PATENT NO. : 7,643,459 B2
APPLICATION NO. : 11/453800
DATED : January 5, 2010
INVENTOR(S) : Miller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 803 days.

Signed and Sealed this

Twenty-first Day of December, 2010

David J. Kappos
*Director of the United States Patent and Trademark Office*